(12) United States Patent
Carter

(10) Patent No.: US 9,204,716 B2
(45) Date of Patent: Dec. 8, 2015

(54) SUPPORT ARRANGEMENT FOR AN INVERTED TABLET

(71) Applicant: Damon A. Carter, Manchester, NH (US)

(72) Inventor: Damon A. Carter, Manchester, NH (US)

(*) Notice: Subject to any disclaimer, the term of this patent is extended or adjusted under 35 U.S.C. 154(b) by 124 days.

(21) Appl. No.: 13/998,895

(22) Filed: Dec. 19, 2013

(65) Prior Publication Data

US 2015/0173506 A1    Jun. 25, 2015

Related U.S. Application Data

(60) Provisional application No. 61/848,146, filed on Dec. 21, 2012.

(51) Int. Cl.
*A47B 23/00* (2006.01)
*A47B 19/00* (2006.01)
*F16M 11/04* (2006.01)
*F16M 11/10* (2006.01)
*F16M 13/00* (2006.01)

(52) U.S. Cl.
CPC .............. *A47B 19/00* (2013.01); *A47B 23/007* (2013.01); *F16M 11/04* (2013.01); *F16M 11/041* (2013.01); *F16M 11/10* (2013.01); *F16M 13/00* (2013.01)

(58) Field of Classification Search
USPC .......... 248/441.1, 444.1, 445, 448, 450, 451, 248/454, 287.1, 924
See application file for complete search history.

(56) References Cited

U.S. PATENT DOCUMENTS

| 3,740,015 | A | * | 6/1973 | Adams | 248/445 |
| 4,718,630 | A | * | 1/1988 | Richard | 248/444.1 |
| 5,129,616 | A | * | 7/1992 | Carson | 248/457 |
| 5,485,980 | A | * | 1/1996 | Luccia | 248/445 |
| 5,655,744 | A | * | 8/1997 | Eisman | 248/445 |
| 6,637,714 | B1 | * | 10/2003 | Hall | 248/444.1 |
| 8,534,619 | B2 | * | 9/2013 | Huang et al. | 248/166 |
| 8,864,089 | B2 | * | 10/2014 | Hung | 248/274.1 |
| 2005/0263666 | A1 | * | 12/2005 | Kim | 248/445 |

* cited by examiner

*Primary Examiner* — Steven Marsh
(74) *Attorney, Agent, or Firm* — Don Halgren

(57) ABSTRACT

A frame arrangement for the inverted support of a tablet to enable a supine individual to read and operate the tablet. The frame arrangement comprises an arrangement of tablet-supporting side members for peripherally surrounding and supporting a tablet, and a plurality of length adjustable leg members attached to an underside portion of the tablet-supporting side members. The leg members have a tightenable universal swivel joint thereat, to permit the leg members to be positionally and lengthwise adjusted adjacent a supine user of the frame arrangement.

17 Claims, 7 Drawing Sheets

SUPPORT ARRANGEMENT FOR AN INVERTED TABLET

BACKGROUND OF THE INVENTION

1. Field of the Invention

This invention relates to framed support devices and more particularly to a portable frame support for maintaining any of a variety of different sized tablet devices in an inverted orientation above an individual, for his/her use thereby, and is based upon Provisional Patent Application No. 61/848,146 filed 21 Dec. 2012, which is incorporated herein by reference in its entirety.

2. Discussion of the Prior Art

Tablets are now the rage. It seems that every household has at least one. They come in various sizes and likely in various shapes. Users of these devices will have to hold them in front of them or possibly on a pillow in their lap. There are however, supports which extend from a wall or a table to hold the tablet in front of the user. There are even supports for holding a tablet in front of someone sitting up in bed.

Children have tablet supports for viewing a tablet inverted while the child is in his/her crib. Such arrangements for young children are of course designed for immovability and non adjustability by the user child.

However, it may be often desirable for older folks/adults to be lying down in bed or other horizontal surface, and to utilize the tablet either by reading or playing a game therewith, from a supine and/or directly under the tablet orientation so as to look upwardly to view the screen of the tablet, while permitting certain freedom of movement, such as twisting or lying slightly on one's side and still be looking upwardly.

The prior art has failed to show such a portable device which permits the acceptance and gentle support of any of different sized and shaped tablet devices to be held and utilized in a comfortable, accessible, inverted orientation.

It is us an object of the present invention, to overcome the disadvantages of the prior art.

It is a further object of the present invention to provide a tablet support arrangement which safely and articulably engages and controls the position of a tablet while an individual is supine, under that tablet looking up at it and using or playing with same.

It is another object of the present invention to provide a tablet support arrangement which may be very portable, and constructed and utilized as in the form of a kit, which minimizes the size of such support arrangement, while maximizing its carryablity.

It is still a further object of the present invention to provide an adjustable or fixed-frame peripheral frame arrangement, which may be dis-assembled and carryable as a kit, while being utilizable for an infinite number of sizes of tablets.

It is yet another object of the present invention to provide an easy gripping arrangement for biasing a tablet within a peripheral frame while allowing maximum viewing of the monitor portion of that tablet.

BRIEF SUMMARY OF THE INVENTION

The present invention comprises an articulable support arrangement for an inverted tablet. In a first preferred embodiment of the present invention, the support arrangement comprises a rectilinear array of side frame members fixedly attached at four corners thereof, each with an adjustable, twistable or fixed length/fixed orientation leg thereat. Each side frame member in this embodiment may comprise a pair of slidably engaged or fixed length extrusion members of generally "C" shape in cross-section. The array of frame the members have their open side of the "C" shape facing towards the center of the support arrangement. Each adjustable or fixed length leg at each corner of the rectilinear support arrangement has a proximal or uppermost end may be in one embodiment, connected to an adjustably tightenable swivel connector attached to the corner of the frame members. Each adjustable leg member may also be individually telescopingly adjustable or distortably twistable to facilitate change in length or non-linear orientation or configuration, as necessary. Each swivel connector in one aspect of the present invention, may be arranged at each corner of the frame assembly to permit each leg to be pivoted so as to be arranged in a tight, stored configuration parallel with its adjacent frame member.

The frame members on each side of the rectilinear array of the support arrangement is preferably of generally "C" shape, as aforementioned, and are preferably formed of a somewhat biased material so as to pinchedly close the gap somewhat, within that tubular member. In a further embodiment of the frame members, the elongated edge of each frame member adjacent its gap, has a soft elastomeric material co-extruded therewith so as to provide a snug supportive engagement with a tablet inserted therewithin.

In another dual frame aspect of the present invention, a peripheral frame may support a tablet-holding inner peripheral frame which inner peripheral fame is borne by a pair of opposed swivel joints on two opposite sides of the outer peripheral frame. The inner peripheral frame, of rectilinear configuration, has side members which are preferably of "L" shape in cross-section. Those side members may have a rubberized tablet engaging surface so as to fully support the periphery of a tablet supported therewithin.

A further aspect of the articulable support arrangement for an inverted tablet, is a tablet support kit comprised of a plurality of individual, tablet-corner-engaging housings of generally triangular shape (in plan view). Each individual, corner-engaging-housing is formed preferably of an injection molded, plastic or rubberized material having a rectilinearly shaped tablet-receiving-opening on its wide end. The tablet receiving opening has a pair of sidewalls arranged at 90° with respect to one another, meeting at an internal apex or corner. The tablet receiving opening has an upper or first roof side and a lower or bottom second floor side arranged parallel to one another, which, with the side walls, defines the biasable elastomeric opening of the housing. The first and second sides in one embodiment thereof, preferably have inwardly bowed or directed gripping members of convex shape, to facilitate the engagement with the corner portions of a tablet inserted therewithin. The apex of each corner-engaging-housing preferably may have a socket or universal swivel joint attached to the outer side of the lower floor thereof. A fixed or twistably adjustable and/or telescopingly adjustable leg has an upper or proximal end thereof which is engageable with an opening of the universal swivel joint or socket on the corner engaging housing. The fixed or twistably adjustable or telescopingly adjustable leg preferably may have a distalmost end with a rubberized footpad thereattached. A corner-engaging-housing is to be fitted onto each corner of a (an inverted) tablet, to permit a person to view that inverted tablet while lying down, directly underneath the tablet, looking upwardly at the screen thereof, as may be done with all of the embodiments of the present invention. The universal joint between the tablet corner-engaging-housing and the respective fixed/adjustable/telescopic legs, may be of a ball and socket arrangement or a pair of swivelable hinges, or the like.

In a further aspect of the tablet corner-engagable-housing, the leg may be received in a molded leg-receiving-opening at the lowermost side of the apex, for simple assembly by the user. Such corner-engageable-housing components enables the "kit" aspects and portability of the present invention. In a further aspect of the tablet corner-engagable-housing, a peripheral frame member may be arranged between adjacent corner-engagable-housing members to provide increased stability therebetween.

A further aspect of the present invention comprises a curvilinear peripheral frame for articulately supporting an inverted tablet therewithin. Such a peripheral frame may be comprised of a plurality of curvilinear "C" shaped sections, size-wise adjustably intermating, as identified in an earlier embodiment recited herein above. Each intermeeting section would be comprised of an outer "C" shaped member and a slidably received inner "C" shaped member. Each outer "C" shaped member would preferably have a universal joint centrally attached on a lower edge thereof. Each universal joint would be arranged to receive the upper end of a longitudinally adjustable leg therewithin. Such a curvilinearly shaped frame would be circumferentially adjustable about its curved outer periphery, so as to supportively hold any shape tablet therewithin. A rectilinear tablet would engage and be supported by the curvilinear frame at four spaced-apart locations around its periphery.

The invention thus comprises a frame arrangement for the inverted support of an inverted tablet to enable a supine individual to read and operate the tablet, the frame arrangement comprising: an arrangement of fixed length or length adjustable, tablet-supporting side members for peripherally surrounding and supporting a tablet; and a plurality of fixed length or fixed length adjustable leg members attached to an underside portion of the tablet-supporting side members, wherein the leg members may have a tightenable receiving socket or a universal swivel joint thereat, to permit the leg members to be positionally and lengthwise fixed or adjusted adjacent a supine user of the frame arrangement. The side members are preferably of "C" shape in cross-section. Each side member may be comprised of a pair of telescopingly adjustable portions intermating with one another. Each side member preferably has a longitudinal gap therealong, for pinching biased receipt of an edge of a tablet therein. The gap in each adjustable portion may have a soft, co-extruded lip thereon to facilitate a grip on a tablet therewith. The tablet supporting side members may comprise a rectilinear inner peripheral tablet supporting frame. The inner tablet supporting frame may be movably supported on an outer peripheral frame assembly. The inner supporting frame is preferably supported by a pair of swivel joints arranged on the outer peripheral frame. The tablet supporting side members may be of curvilinear configuration. The curvilinear configured tablet supporting side members may be of "C" shape in cross section.

The invention also comprises a kit assembly for the inverted support of an inverted tablet to enable a supine individual to read and operate the tablet, the frame arrangement comprising: a plurality of fixed or length/shape adjustable, tablet-supporting tablet corner-engaging-housing members for receiving corners of a tablet for support thereof; and a length adjustable leg members attached to an underside portion of the tablet corner-engaging-housing members, wherein the leg members may have a tightenable universal swivel joint thereat, to permit the leg members to be positionally and lengthwise adjusted adjacent a supine user of the frame arrangement. The tablet corner-engaging-housing member preferably has a molded triangular shaped opening for receipt of a tablet corner therein. The shaped opening has a biased inwardly lower floor and a biased inwardly upper side. The housing member preferably has the universal joint on a lower apex portion thereof. The leg member is preferably telescopingly adjustable.

The invention also comprises a method of supporting an inverted tablet to enable a supine user of an inverted tablet to secure and utilize that inverted tablet comfortably, comprising: arranging a frame assembly comprising a peripheral, tablet-engaging side member support so as to supportively engage a tablet by a perimeter thereof; and attaching a plurality of articulable, fixed or length-adjustable legs on an underside of the frame assembly so as to permit the frame assembly to straddle a supine user of that frame assembly. The frame members may have a bluetooth speaker system arranged thereon for enhancement of a tablet sound to a user observing supinely beneath a bluetooth enabled tablet.

BRIEF DESCRIPTION OF THE DRAWINGS

The objects and advantages of the present invention will become more apparent, when viewed in conjunction with the following drawings, in which.

DETAILED DESCRIPTION OF THE PREFERRED EMBODIMENTS

Figure 1:
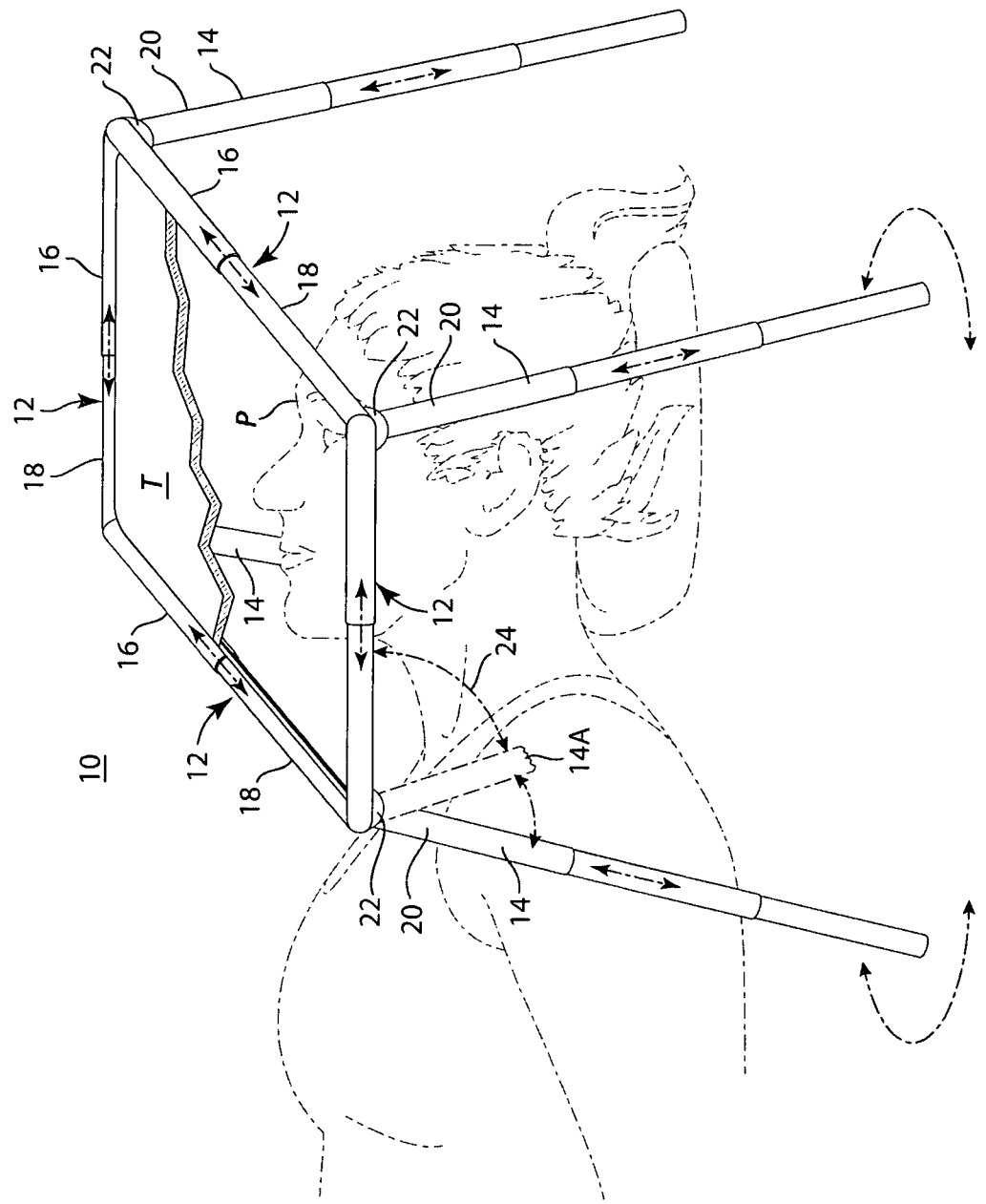
FIG. 1 is a perspective view of a rectilinear articulable support arrangement for peripherally supporting an inverted tablet.

Referring now to the drawings in detail, and particularly to FIG. 1, there is shown the present invention which comprises an articulable support arrangement 10 for an inverted tablet "T". In a first preferred embodiment of the present invention, the support arrangement 10 comprises a rectilinear array of side frame members 12 fixedly attached at four corners thereof, each with an adjustable (or fixed size/shape) leg 14 threat. Each side frame member 12 in this embodiment comprises a pair of slidably engaged extrusion members 16 and 18 of generally "C" shape in cross-section, as may be seen in FIGS. 1, 1A and 1B. The array of frame members 12 have their open side of the "C" shape facing towards the center of the support arrangement 10, as represented in FIG. 1. Each adjustable leg 14 at each corner of the rectilinear support arrangement 10 has a proximal or uppermost end 20 which is connected to an adjustably tightenable swivel connector 22 attached to the corner of the adjacent, connected frame members 12. Each leg member 14 in this embodiment, is also individually telescopingly adjustable to facilitate change in length as necessary. Each swivel connector 22 at each corner of the frame assembly 10 permits each leg 14 to be pivoted so as to be arranged in a tight, stored configuration close to and parallel with its adjacent frame member 12, as represented by leg 14A in phantom and arrow 24, shown in FIG. 1. A tablet user "P" is represented looking upwardly, with his head shown directly underneath the support arrangement 10 in FIG. 1, with a set of its legs 14, which would preferably be abutting the shoulders (not shown for clarity of the drawings) of that user "P".

Figure 1A:
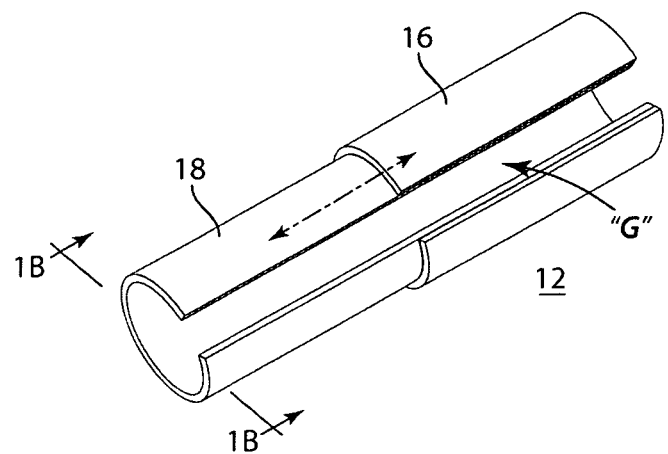
FIG. 1A is in a large perspective view of a pair of side members of the support arrangement shown in FIG. 1.

The frame members 12 on each side of the rectilinear array of the support arrangement 10 is of generally "C" shape, as aforementioned, and are preferably formed of a somewhat biased material so as to pinch somewhat closed the gap "G" within that tubular member 12, as represented in FIG. 1A.

Figure 1B:
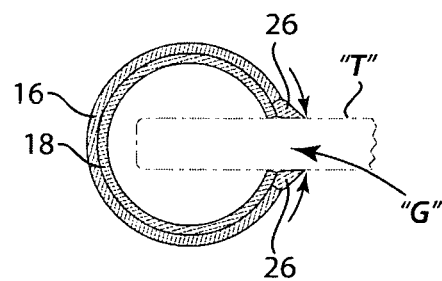
FIG. 1B is a view taken along the lines B-B. of FIG. 1A.

In a further embodiment of the frame members, the elongated edge of each frame member adjacent its gap "G", has an elongated, tapered strip of soft elastomeric material 26, co-extruded therewith so as to provide a snug, supportive, biased engagement with a tablet "T", inserted therewithin, as represented in FIG. 1B.

Figure 2:
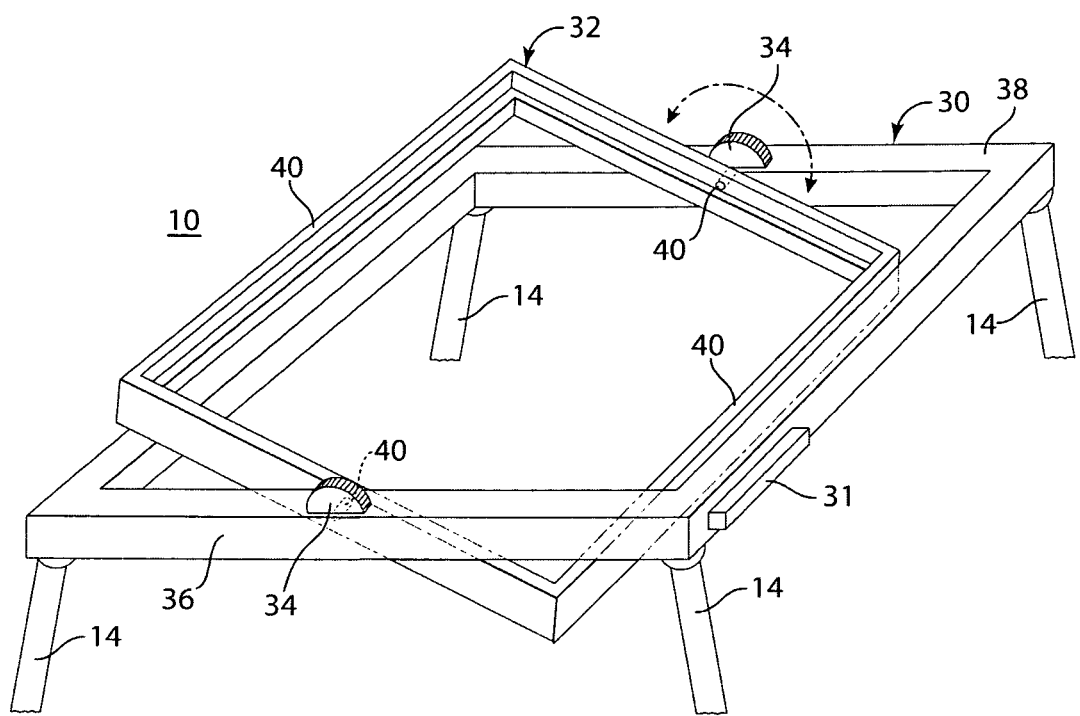
FIG. 2 is a perspective view of a further embodiment of a rectilinear articulable support arrangement showing an inner peripheral frame utilized therewith.
Figure 2A:
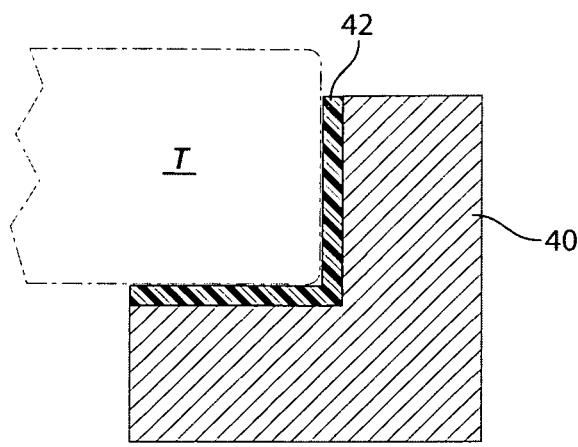
FIG. 2A is an enlarged sectional view taken along the lines 2A-2A of FIG. 2.

In another aspect of the present invention, an outer peripheral frame 30 may support a tablet-holding inner peripheral frame 32 which inner peripheral fame 32, shown in phantom, is borne by a pair of opposed swivel joints 34 on two opposite sides 36 and 38 of the outer peripheral frame 30, as represented in FIG. 2. The inner peripheral frame 32, of rectilinear configuration, has side members 40 which are preferably of "L" shape in cross-section, as shown in FIG. 2A. Those side members 40 may have a rubberized tablet engaging surface 42 so as to fully support the periphery of a tablet "T" supported therewithin, as represented in FIG. 2A. A blue-tooth speaker system 31 may be attached on a side frame member 36 to facilitate sound reception to a supine tablet user beneath the support arrangement 10, the speaker system 31 shown represented in FIG. 2.

Figure 3:
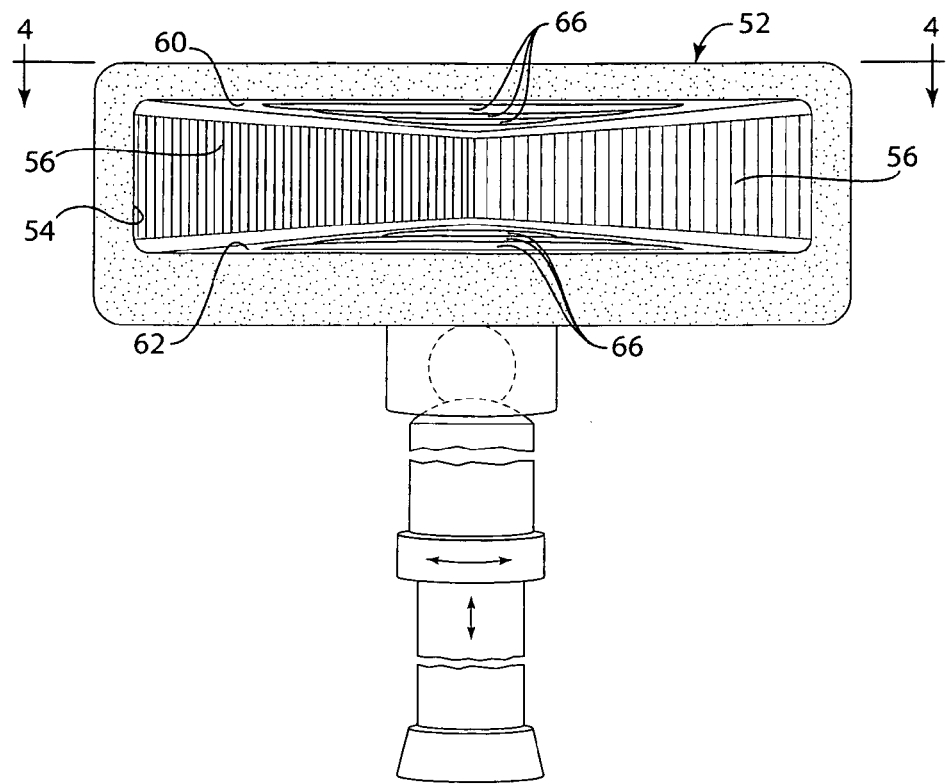
FIG. 3 is a side elevation of view of a tablet corner engaging housing of the present invention.
Figure 4:
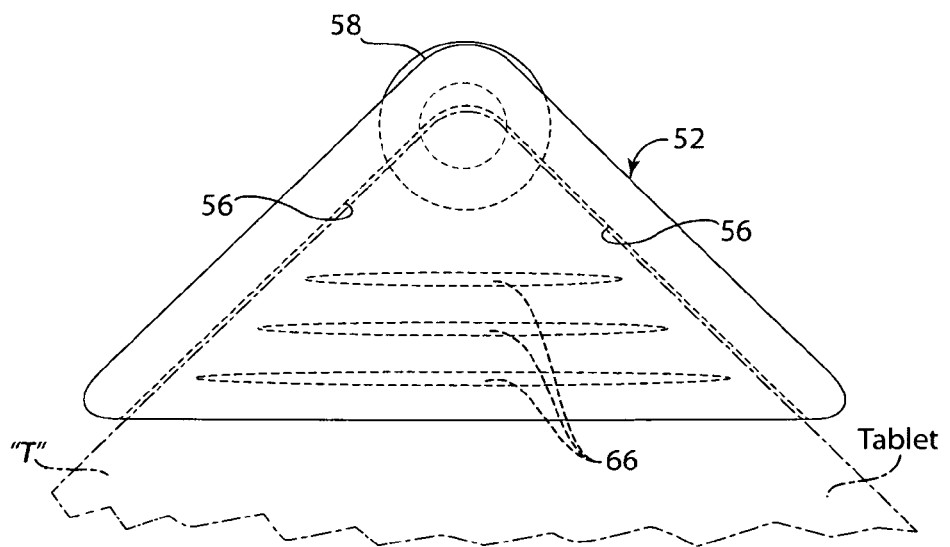
FIG. 4 is a view taken along the lines 4-4 of FIG. 3.
Figure 5:
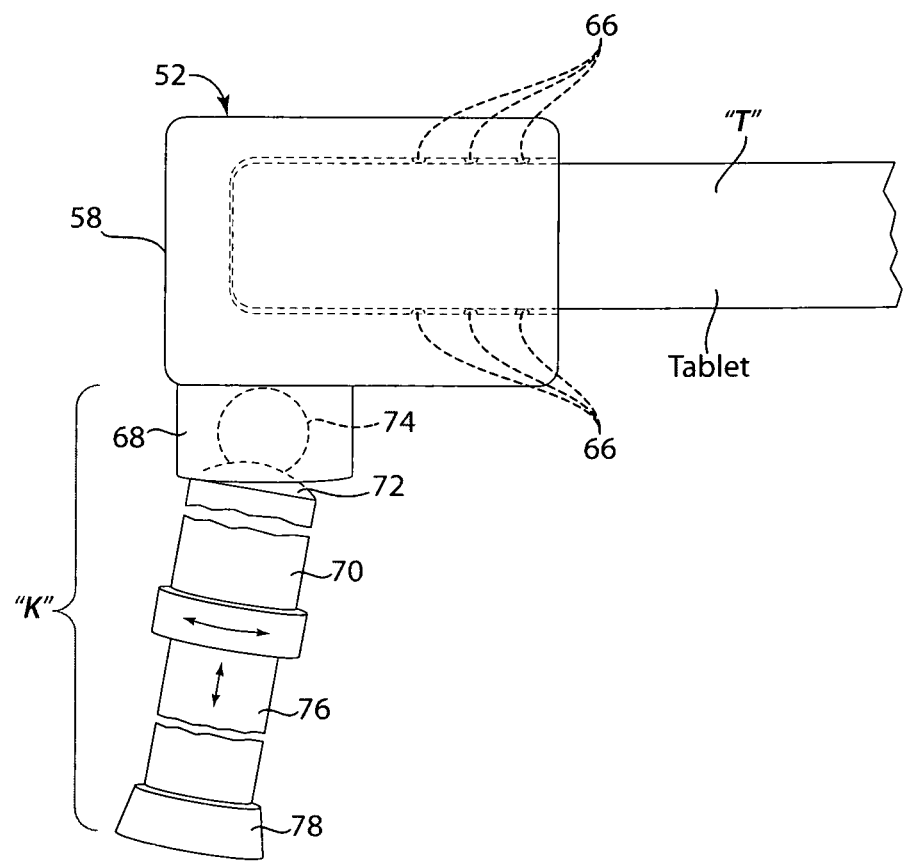
FIG. 5 is a side elevation of view of the tablet corner of engaging housing shown in FIG. 3.

A further aspect of the articulable support arrangement for an inverted tablet, is a tablet support kit 50 comprised of a plurality of tablet corner-engaging housings 52 of generally triangular shape (in plan view), as represented in FIG. 4, and as shown in a side elevational view in FIG. 3. Each corner-engaging-housing 52 is formed preferably of an injection molded, plastic or rubberized material having a rectilinearly shaped tablet-receiving-opening 54 on its wide end, as represented in FIG. 3. The tablet receiving opening 54 has a pair of sidewalls 56 arranged at 90° with respect to one another, meeting at an internal apex or corner 58, as represented in FIG. 4. The tablet receiving opening 54 has an upper or first roof side 60 and a lower or bottom second floor side 62 arranged parallel to one another, which, with the side walls 56, defines the triangularly shaped tablet-receiving opening of the housing 52, as represented in FIGS. 3 and 4. The first and second sides 60 and 62 in one embodiment thereof, preferably have inwardly bowed or directed gripping members 66 of inwardly bowed convex shape as shown in FIG. 3, to facilitate the engagement with the corner portions of a tablet "T" inserted therewithin, as represented in FIGS. 4 and 5. The apex 58 of each corner-engaging-housing 52 preferably has a universal swivel joint 68 attached to the outer side of the lower floor 62 thereof, as represented in FIG. 5. A telescopingly adjustable leg 70 has an upper or proximal end 72 thereof which is engageable with an opening 74 of the universal swivel joint 68 on the corner 58 of the tablet corner-engaging-housing 52. The telescopingly adjustable leg 70 preferably has a distalmost end 76 with a rubberized footpad 78 thereattached.

A corner-engaging-housing 52 as part of a kit "K", represented partially in FIG. 5, is to be fitted onto each corner of a (an inverted) tablet "T", to permit a person to easily view that tablet "T" from directly underneath the tablet "T" without distortion and stress, while lying down and looking upwardly at the screen thereof, as may be done with all of the embodiments of the present invention. The universal joint 68 between the tablet corner-engaging-housing 52 and the respective telescopic legs 70, may be of a ball and socket arrangement or a pair of swivelable hinges, or the like. Such kit "K" would be comprised of corner members, legs and any connecting side members of the several embodiments described within this presentation.

Figure 6:
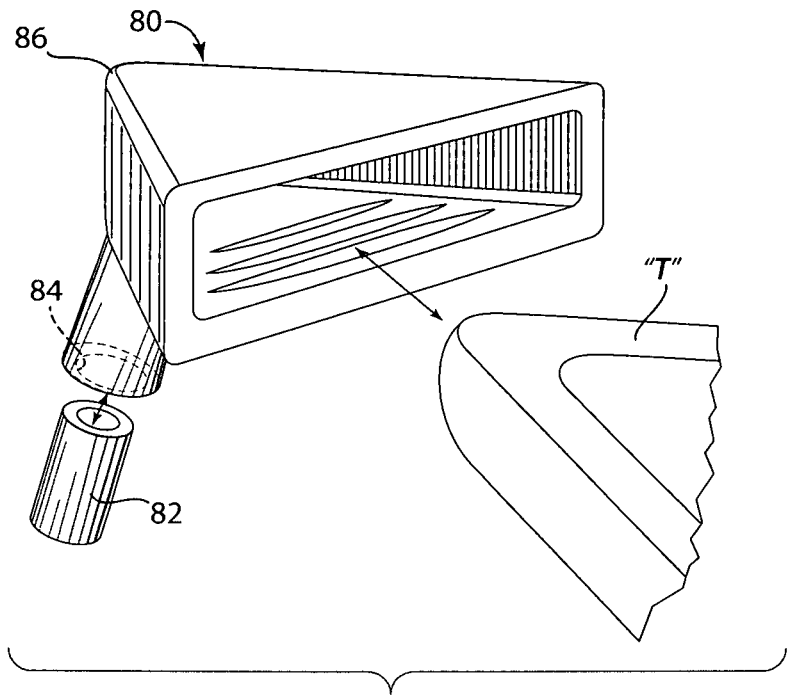
FIG. 6 is a perspective view of a further embodiment of a tablet corner engaging housing.

In a further aspect of a tablet corner-engagable-housing 80, a leg may 82 be received in a molded leg-receiving-opening 84 at the lowermost side of the apex 86, for simple assembly by the user, as represented in FIG. 6.

Figure 6A:
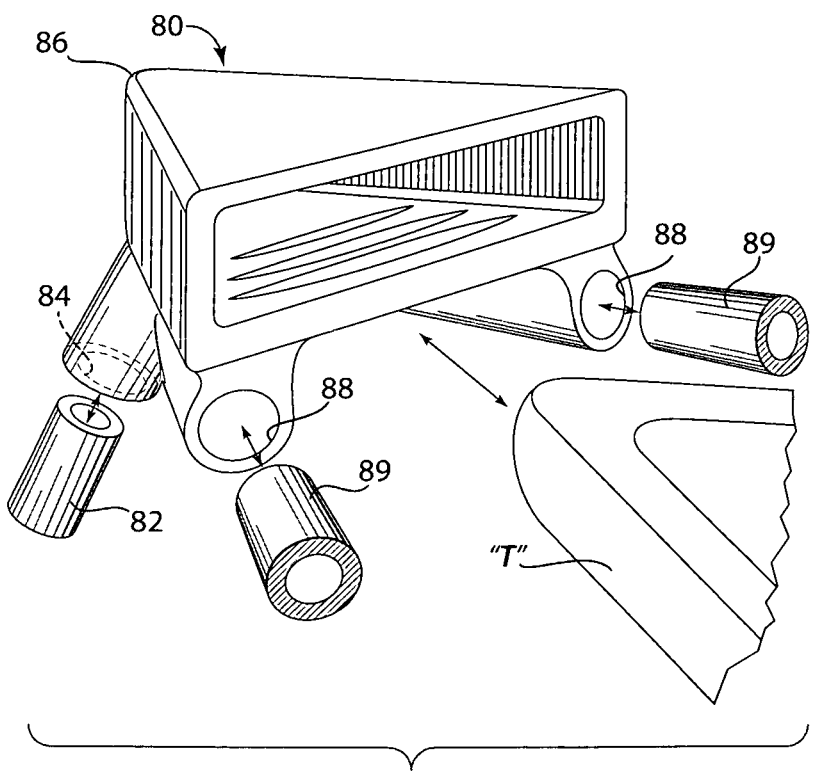
FIG. 6A is a perspective vies of the corner engaging housing shown in FIG. 6, with peripheral socket-attachable side members for added tablet support.

FIG. 6A represents a further aspect of the individual tablet-corner squeezing corner support members wherein a side member receiving socket 88 enables secure receipt of a peripheral side member 89, a plurality of such side members 89 being utilized in this aspect between contiguous corners to further peripherally stabilize an inverted tablet "T" around a supine tablet user "P". Such corner-engageable-housing components 52 and 80, further enables the "kit" aspects and portability of the present invention comprised of corners 52 and legs 70.

Figure 7:
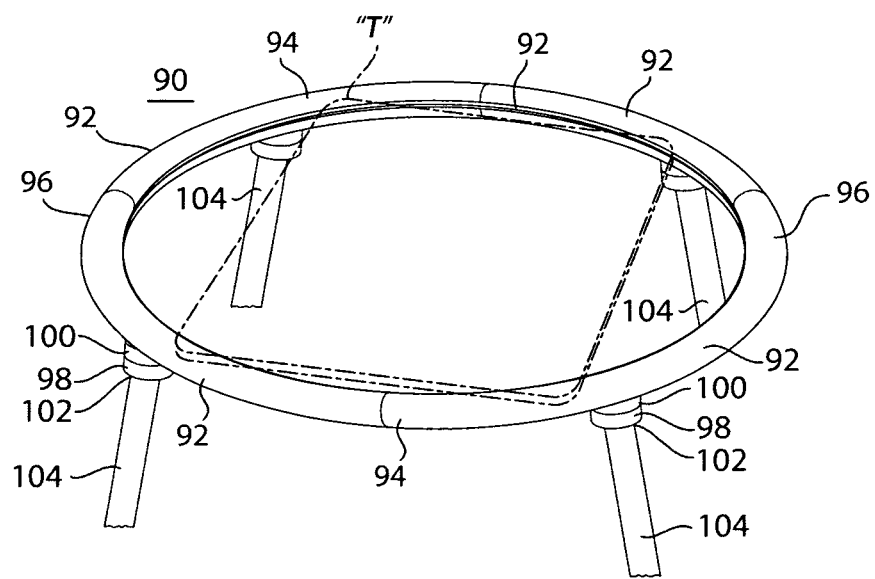
FIG. 7 is a perspective view of a circular or curvilinearly shaped tablet-engaging frame.

A further aspect of the present invention comprises a curvilinear peripheral frame 90 for articulately supporting an inverted tablet therewithin. Such a curved peripheral frame 90, represented in FIG. 7, may be comprised of a plurality of curvilinear "C" shaped sections 92, size-wise adjustably intermating, as identified in an earlier embodiment recited herein above, for example in FIG. 1A. Each intermating section 92 would be comprised of an outer "C" shaped member 94 and a slidably received inner "C" shaped member 96. Each outer "C" shaped member would preferably have a universal joint 98 centrally attached on a lower edge 100 thereof, as represented in FIG. 7. Each universal joint 98 would be arranged to receive the upper end 102 of a longitudinally adjustable leg 104 therewithin. Such a curvilinearly shaped peripheral frame 90 would be circumferentially adjustable about its curved outer periphery, so as to supportively hold any shape tablet "T" therewithin.

The invention claimed is:

1. A frame arrangement for the inverted support of a tablet to enable a supine individual to read and operate the inverted tablet, the frame arrangement comprising:
   a four-sided arrangement of tablet-supporting side members, each connected at a corner thereof for peripherally surrounding and supporting an inverted tablet; and
   a leg member attached to an underside portion of the tablet-supporting side members at their respective connected corners, wherein the leg members and connected side members permit a supine user of the frame arrangement to view an inverted tablet from directly therebeneath, wherein the side members are comprised of telescopingly adjustable portions intermating with one another enabling tablet gripping size adjustment.

2. The frame arrangement as recited in claim 1, wherein the side members are of "C" shape in cross-section.

3. The frame arrangement as recited in claim 2, wherein each side member has a longitudinal gap therealong, for pinching biased receipt of an edge of an inverted tablet therein.

4. The frame arrangement as recited in claim 3, wherein the gap in each adjustable portion has a soft, co-extruded lip thereon to facilitate a grip on an inverted tablet therewith.

5. The frame arrangement as recited in claim 1, wherein the tablet supporting side members comprises a rectilinear inner peripheral tablet supporting frame.

6. The frame arrangement as recited in claim 5, wherein the inner tablet supporting frame is movably supported on an outer peripheral frame assembly.

7. The frame arrangement as recited in claim 6, wherein the inner supporting frame is supported by a pair of swivel joints arranged on the outer peripheral frame.

8. The frame arrangement as recited in claim 1, wherein the tablet supporting side members are of curvilinear configuration.

9. The frame arrangement as recited in claim 8, wherein the curvilinear configured tablet supporting side members are of "C" shape in cross section.

10. The frame arrangement as recited in claim 1, wherein the legs are adjustable with respect to height thereof, and with respect to angularity with the side members.

11. A kit assembly for the inverted support of a tablet to enable a supine individual to read and operate the inverted tablet, the frame arrangement comprising:

a plurality of flexibly resilient, inverted-tablet-supporting tablet-corner-engaging-housing members for squeezably receiving corners of an inverted tablet for inverted support thereof, wherein the housing members have a side member receiving socket on a side thereof for receipt of a peripheral side member therein, to assist in support and stability of an inverted tablet therewithin; and a leg member attachable to an underside portion of each of the flexibly resilient tablet corner-engaging-housing members, to permit the leg members to be positionally adapted adjacent a supine user of the frame arrangement, allowing a supine tablet user to view the tablet from directly underneath thereof.

12. The kit assembly as recited in claim 11, wherein the tablet corner- engaging-housing member has a molded triangular shaped opening for squeezable, biased receipt of an inverted tablet corner therein.

13. The kit assembly as recited in claim 12, wherein the shaped opening has a biased inwardly shaped lower floor and a biased inwardly shaped upper side.

14. The kit assembly as recited in claim 12 wherein the housing member has a leg receiving socket on a lower apex portion thereof for receipt of a support leg thereat.

15. The kit assembly as recited in claim 14, wherein each leg member is telescopingly adjustable.

16. A method of supporting an inverted tablet to enable a supine user of a tablet to secure and utilize that inverted tablet comfortably, comprising:

arranging a frame assembly comprising a peripheral, tablet-engaging side frame member support arrangement so as to supportively engage an inverted tablet by a perimeter thereof, wherein the frame member support arrangement includes a blue-tooth arrangement arranged thereon for enhancement of a tablet sound to a user observing supinely beneath the tablet; and attaching a plurality of articulable, length-adjustable legs on an underside of the frame assembly so as to permit the frame assembly to straddle a supine user of that frame assembly.

17. The method as recited in claim 16, wherein the frame assembly includes a molded flexibly resilient tablet-corner-engaging-housing.

* * * * *